United States Patent [19]

Middleton

[11] 3,729,804

[45] May 1, 1973

[54] METHOD OF MAKING A MECHANICAL JOINT

[75] Inventor: Verne L. Middleton, East Alton, Ill.

[73] Assignee: Olin Corporation, New Haven, Conn.

[22] Filed: Aug. 19, 1970

[21] Appl. No.: 64,983

[52] U.S. Cl. .................29/432, 29/21.1, 29/509, 29/521, 113/116 FF, 287/189.36 D
[51] Int. Cl. ...................................B23p 11/00
[58] Field of Search.................29/432, 21.1, 509, 29/521; 113/116 FF; 287/189.36 D

[56] References Cited

UNITED STATES PATENTS

| | | | |
|---|---|---|---|
| 1,446,095 | 2/1923 | Karaus | 29/432 UX |
| 2,713,197 | 7/1955 | Schmidt | 29/432 |
| 3,130,489 | 4/1964 | Schlage | 29/432 |
| 3,216,758 | 11/1965 | Bohlen | 29/432 X |
| 3,276,112 | 10/1966 | Tantlinger et al. | 29/432 |

*Primary Examiner*—Charlie T. Moon
*Attorney*—Robert H. Bachman and Gordon G. Menzies

[57] ABSTRACT

A method and apparatus for joining two or more sheets of metal together and the composite metal blank and mechanical joint produced thereby. A punch and die apparatus is employed wherein a slug is extruded from a first sheet and embedded in a hole provided in a second sheet by the punching action of the slug. The punch never contacts the die itself and the resulting joint is between the slug from the first sheet and the second sheet in which it is embedded. The slug formed from the second sheet is sheared from the composite. By performing this operation in opposing corners of the two sheets, the sheets are secured together so as to prevent relative motion between them. The invention is particularly applicable to the formation of composite metal blanks having a pattern of stop-weld material sandwiched between the sheets.

3 Claims, 16 Drawing Figures

Patented May 1, 1973
3,729,804
3 Sheets-Sheet 1
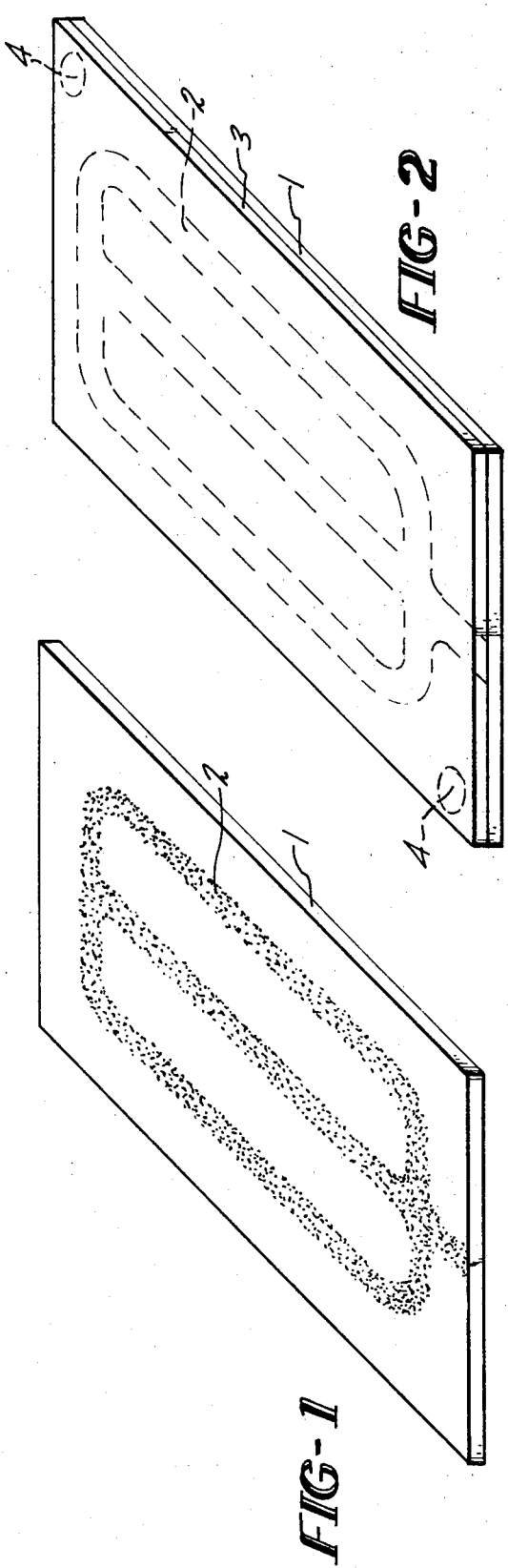
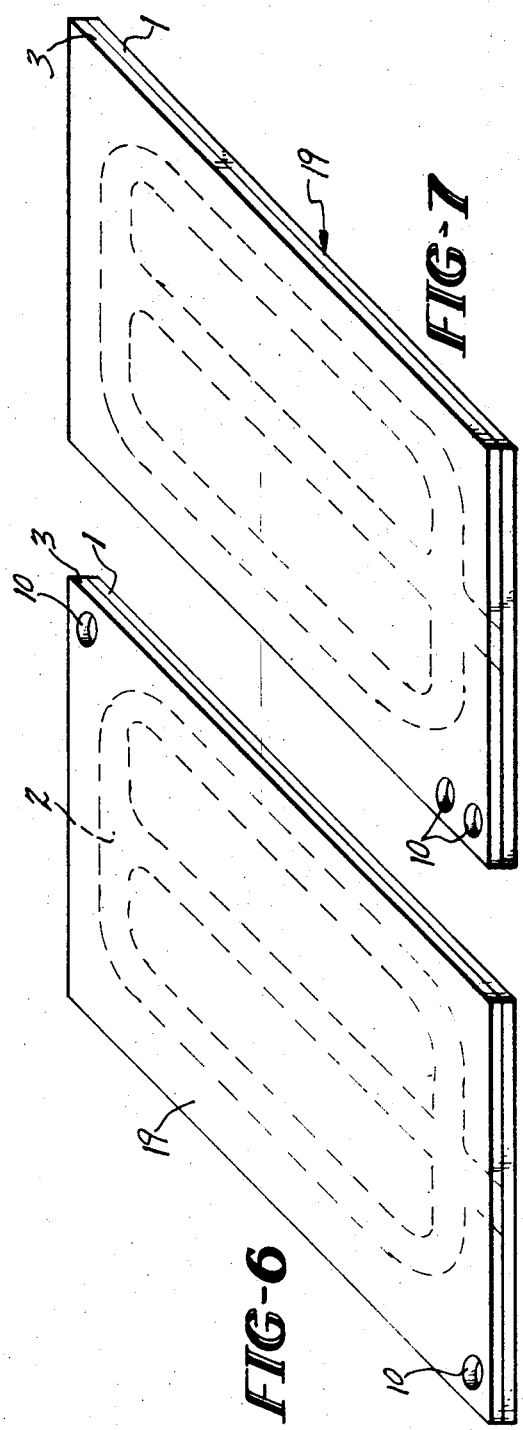
INVENTOR:
VERNE L. MIDDLETON
BY
ATTORNEY

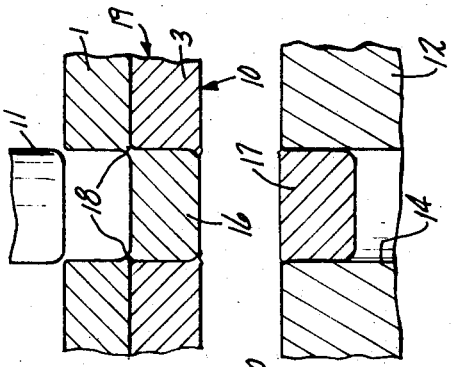
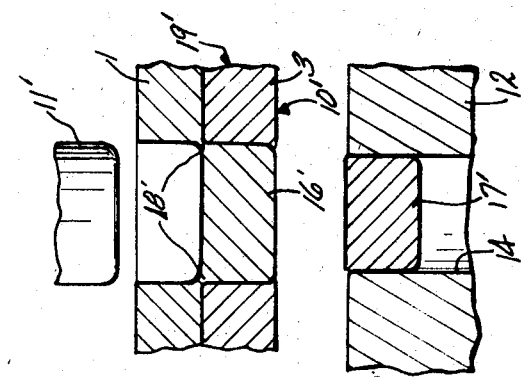
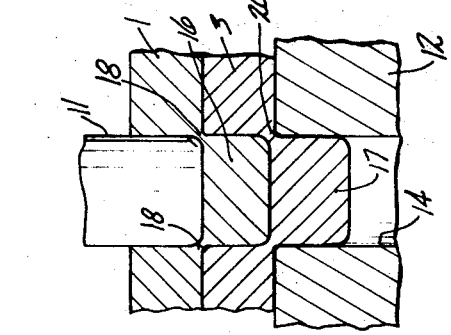
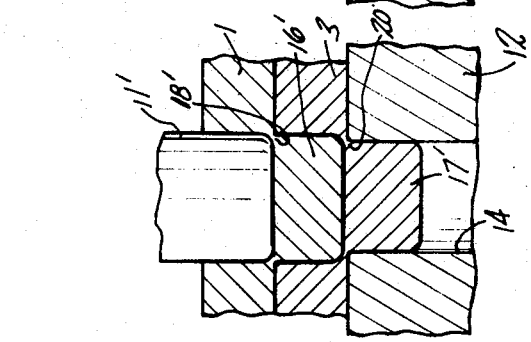
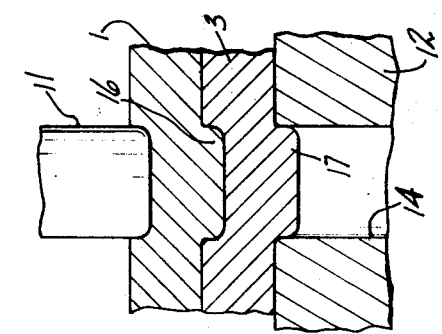
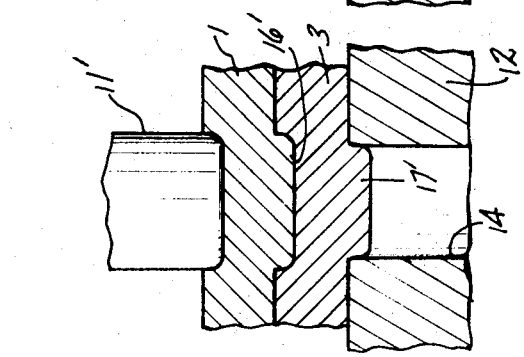
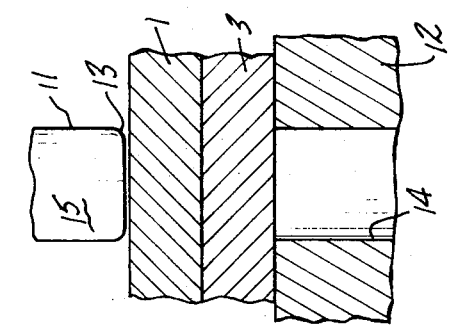
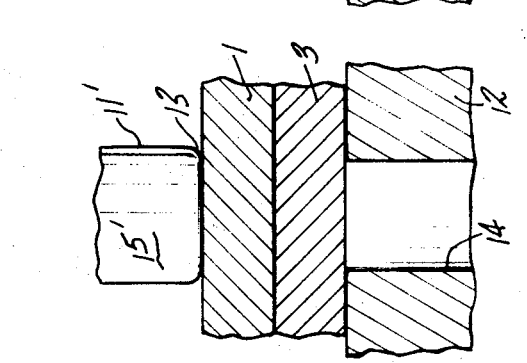
INVENTOR
VERNE L. MIDDLETON

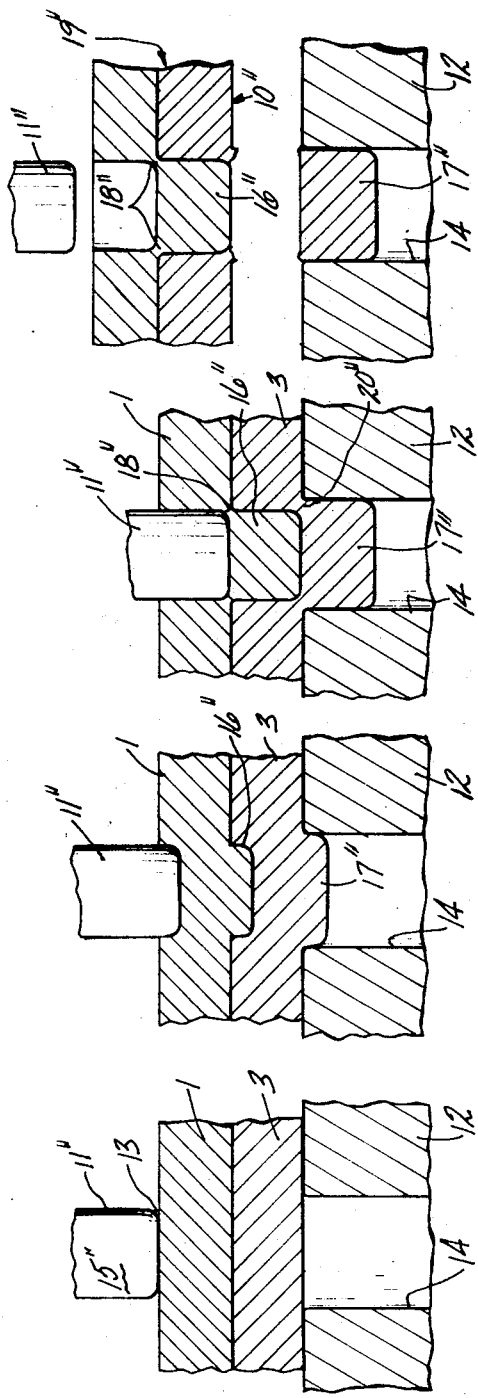

METHOD OF MAKING A MECHANICAL JOINT

BACKGROUND OF THE INVENTION

This invention relates to a method and apparatus for joining two or more sheets of metal together, and the composite metal blank produced thereby. The invention is particularly applicable to the formation of composite metal blanks having a pattern of stop-weld material sandwiched between the sheets.

In the formation of composite metal sheet by rolling superimposed sheets so as to bond them together, it is generally desirable to secure the starting sheets together to prevent relative motion between them. This is essential in the case where there is a pattern of stop-weld material sandwiched between the sheets. Numerous joining methods are known in the art for securing the starting sheets together prior to rolling. Spot-welding using resistance welding equipment is the method most frequently used. Normally, a spot-weld is placed in each of at least two opposing corners of the sheets.

While the spot-welding technique can be used for this purpose, it suffers from several drawbacks. It is difficult to form spot-welds which are small and yet possess sufficient strength to secure the sheets. Therefore, a greater amount of scrap is generated because of the size of the spot-welds. Further, spot-welding equipment is expensive and it normally includes electrical circuits in the generating and control units, which tend to increase down time for maintenance.

SUMMARY OF THE INVENTION

In accordance with this invention, a simple mechanical technique has been developed for securing the two or more sheets of metal together. The technique involves a punch and die apparatus wherein a slug is extruded from a first sheet and embedded into a hole provided in a second sheet by the punching action of the slug. The punch never contacts the die itself and the resulting joint is between the slug from the first sheet and the second sheet in which it is embedded. A slug formed from the second sheet is sheared from the composite. By performing this operation in opposing corners of the sheets, they are secured together so as to prevent relative motion between them.

Accordingly, it is an object of this invention to provide a process for mechanically joining at least two sheets of metal together, wherein a slug of metal from a first sheet is embedded in a second sheet.

It is another object of this invention to provide a process as above, wherein the at least two sheets after joining are pressure welded together to form a composite metal sheet.

It is a further object of this invention to form a composite metal sheet as above, wherein a pattern of stop-weld material is sandwiched between the original sheets of metal.

It is a further object of this invention to provide an apparatus in the nature of a punch and die for extruding a slug of metal from a first sheet of metal and embedding it into a second sheet of metal upon which the first is superimposed.

It is a further object of this invention to provide an apparatus as above wherein the punch may have a larger or smaller diameter than the diameter of the die cavity.

It is a further object of this invention to provide a composite metal blank comprising at least two sheets of metal for forming into a composite metal sheet wherein the blank has at least two joints comprising a slug of metal from a first superimposed sheet embedded in a second sheet.

It is a further object of this invention to provide a composite metal blank as above, wherein a pattern of stop-weld material is sandwiched between the original sheets.

It is a further object of this invention to provide a mechanical joint for joining at least two sheets of metal together, wherein a slug of metal from a first sheet of metal is embedded in a second sheet of metal upon which the first is superimposed, the slug of metal having web portions still connected to the first sheet of metal.

Other objects and advantages will become more apparent from the following description and drawings, in which:

BRIEF DESCRIPTION OF THE DRAWINGS

FIG. 1 shows a perspective view of a sheet of metal useful with this invention, the sheet of metal having a pattern of stop-weld material on its surface.

FIG. 2 shows a perspective view of a composite metal blank formed in accordance with the prior art.

FIG. 3 shows a series of cross sectional views illustrating the method, apparatus and joint formed in accordance with this invention wherein the punch diameter is substantially the same as the die cavity diameter.

FIG. 4 shows a series of cross sectional views illustrating the method, apparatus and joint formed in accordance with this invention wherein the punch diameter is greater than the die cavity diameter.

FIG. 5 shows a series of cross sectional views illustrating the method, apparatus and joint formed in accordance with this invention wherein the punch diameter is smaller than the die cavity diameter.

FIG. 6 shows a perspective view of a composite metal blank formed in accordance with this invention.

FIG. 7 shows a perspective view of a different embodiment of a composite metal blank formed in accordance with this invention.

DESCRIPTION OF THE PREFERRED EMBODIMENTS

The instant invention comprises a method of mechanically joining at least two superimposed sheets of metal together. The joining process in accordance with this invention utilizes a punch and die. The punch and die are of novel design in that the leading edge of the punch has a radius and further in that the punch may be larger or smaller in diameter than the diameter of the die cavity. When the punch engages the at least two superimposed sheets of metal, it forces a slug from a first sheet to be embedded in a second sheet and a resulting slug from the second sheet to be essentially removed therefrom.

The joint then comprises a slug from the first sheet which remains joined to the first sheet by a web portion integral with the first sheet and is joined to the second sheet by being embedded therein in a tight mechanical interfit. The use of two such joints provides sufficient strength to prevent relative motion between the superimposed sheets prior to their being pressure welded together.

The invention is broadly applicable to the joining of any two sheets of ductile metal or alloys together but for reasons which will become apparent later, it is preferred for use with highly ductile metals, generally, non-ferrous ones, such as copper, copper alloys, aluminum and aluminum alloys. The method is particularly applicable to the formation of ROLL-BOND type panels in accordance with the process of the Grenell U.S. Pat., No. 2,690,002, granted Sept. 28, 1954, assigned to the assignee of the instant invention, wherein a pattern of stop-weld material is sandwiched between the sheets of metal which are joined together.

Referring now to FIG. 1, there is shown a sheet 1 of metal which is the typical starting material in this invention. The sheet 1 of metal may be of any metal which is capable of being joined as hereinafter described. Preferably, the sheet 1 of metal is the starting material for making a ROLL-BOND heat exchanger panel wherein a pattern of stop-weld material 2 is included on its surface.

As shown in FIG. 2, a second sheet 3 of metal is superimposed on top of the first sheet 1 of metal. In general, the second sheet 3 of metal may be of the same metal as the first 1 or it may be of a different metal or alloy. Further, the thicknesses of the two sheets 1 and 3 need not be the same. The superimposed sheets 1 and 3 are formed into a composite metal sheet by pressure welding as by rolling in accordance with the process of the Grenell U.S. Pat., No. 2,690,002 or U.S. Pat. No. 3,397,045, by J. Winter, granted Aug. 13, 1968, assigned to the assignee of the instant invention. However, other methods of forming composite metal sheet could be employed.

It is generally desirable prior to pressure welding the sheets 1 and 3 together to secure the sheets 1 and 3 to prevent relative motion between them so they will remain in a predetermined relationship during handling. In the past, the sheets 1 and 3 were secured together as shown in FIG. 2 by means of spot-welds 4. The disadvantages of this approach have already been discussed but in summary, the size of the spot-welds is such that a greater amount of scrap than desired is left in the tails or ends of the composite metal sheet after it is formed, and further, the spot-welding technique is not as economical as desired.

In accordance with this invention, a simple mechanical joint 10 is substituted for the spot-welds 4. The process and apparatus for obtaining this joint 10 is illustrated in FIG. 3. The apparatus comprises a punch 11 and a die 12. The punch 11 has a radius 13 about its leading edge. This is contrary to the normal design of a punch for a blanking type operation. However, the presence of a radius 13 on the leading edge of the punch 11 is essential to this invention to provide the necessary piercing and drawing action. The die 12 generally has a cylindrical cavity 14 and is a conventional blanking type die. It should be noted that the standard tolerances and clearances for normal blanking operations do not apply with the instant method and apparatus since as will be described hereinafter, the punch 11 may have a diameter which is greater or less than the diameter of the die cavity 14.

Further, while the punch 11 and die 12 which will be described have a cylindrical surface 15 and cavity 14, respectively, any desired configuration could be used, for example, the punch surface and die cavity could be square or any other desired shape. Further, it is not necessary that the punch and die cavity have exactly the same shape. The invention will be described with reference to the joining of two sheets of metal together, however, it is applicable to the joining of more than two sheets.

Referring again to FIG. 3a, the two superimposed sheets 1 and 3 of metal are placed on the die 12. The punch 11 having the desired radius 13 on its leading edge engages the surface of the first sheet 1 of metal. FIG. 3b shows that as the punch 11 enters the first sheet 1, metal 16 from the first sheet 1 is extruded downward, essentially becoming an extension of the punch 11. This metal 16 forms a slug which extrudes metal 17 from the second sheet 3 into the die cavity 14. As the punch 11 continues downward as shown in FIG. 3c, the slug 16 continues to develop and draws the metal from the first sheet 1 forming the continuous web 18.

The slug 16 continues to displace metal from the second sheet 3 into the die cavity 14 forming the slug 17 which is sheared from the second sheet 3 as the blank 19 comprising the joined sheets 1 and 3 is removed from the die. After the punch 11 finishes its stroke, the slug 17 from the second sheet 3 is displaced and sheared off and the slug 16 from the first sheet 1 is embedded in the second sheet 3 replacing the slug 17. The web 18 has been drawn down, but sufficient metal is left therein to provide a firm attachment between the two sheets 1 and 3 of metal. The slug 17 from the second sheet 3 of metal following the punches stroke is generally still attached to the second sheet 3 of metal by very thin web 20. However, in removing the blank 19 from the die, the slug 17 is normally broken off. If desired, the stroke of the punch 11 may be extended slightly so that the slug 17 from the second sheet 3 is sheared off by the die 12.

The mechanical joint 10 as shown in FIG. 3d comprises the slug 16 from the first sheet 1 being embedded in the second sheet 3 and not extending out of the second sheet. The slug 16 is joined to the first sheet 1 by the web 18. The use of two or more such joints provides sufficient strength to prevent relative motion between the sheets 1 and 3 of the blank 19 prior to pressure welding it to form a composite metal sheet.

FIG. 4 illustrates the instant invention wherein the punch 11' has a larger diameter than the diameter than the die cavity 14. The slug 16' from the first sheet 1 becomes larger than the die cavity 14 as shown in FIG. 4b, and therefore, the directionality of metal from the slug 16' as it nears the die results in superior shearing of the slug 17' from the second sheet 3 as shown in FIGS. 4c and 4d. However, the web 18' thickness is substantially reduced.

FIG. 5 shows the effect of using a punch of smaller diameter than the die cavity. This results as shown in FIG. 5b in a slug 16'' from the first sheet 1 having a diameter smaller than the die cavity 14 and as shown in FIGS. 5c and 5d in a web 20'' formed between the second sheet 3 and the slug 17'' formed out of it, which is thicker and more difficult to shear than the webs 20 and 20' in accordance with the previous two embodiments. The web 18'' between the slug 16'' of the first sheet 1 and the second sheet 3 is also thicker providing for a stronger joint 10''.

Therefore, it is seen that there is a tradeoff between web 18 and 20 thickness, joint strength and shearing performance. As the web 18 and 20 thickness increases, joint strength increases, however, shearing performance is reduced and visa versa.

It is also possible to increase web 18 and 20 thickness by increasing the radius of the leading edge of the punch and visa versa. Therefore, web thickness may be controlled by adjusting the punch diameter relative to the die cavity diameter or by changing the radius on the leading edge of the punch.

If it is desired to employ larger web 18 and 20 thicknesses, the reduction in shearing performance can be offset somewhat by increasing the required punch 11 travel. However, it will also increase the wear and tear on the punch 11 and die 12.

EXAMPLE

The process and apparatus for forming the joint 10 of this invention have been employed as follows:

Two sheets of aluminum having a pattern of stop-weld material sandwiched between them were secured together using a punch having 0.234 inch diameter and a die having a 0.239 inch diameter cavity. This resulted in a joint as shown in FIG. 3d. In order to prevent motion between the sheets prior to pressure welding, it is necessary to employ at least two joints in accordance with this invention.

As shown in FIG. 6, it is preferred to have the joints 10 of this invention made in opposing corners of the superimposed sheets 1 and 3 to form the blank 19. However, in accordance with another embodiment of this invention as shown in FIG. 7, the joints may be formed in the same corner of the superimposed sheets. Spacing apart of the two or more joints better prevents relative motion between the sheets. By placing the joints in the same corner of the superimposed sheets, there is a significant economy of time and effort for carrying out this process.

It is to be understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within its spirit and scope as defined by the claims.

What is claimed is:

1. A process of forming a joint between at least two sheets of metal, comprising the steps of:
    A. superimposing at least one first sheet of metal upon at least one second sheet of metal;
    B. forming a first slug of metal from a portion of said first superimposed sheet by extruding said first slug from said first sheet by the action of a punch, said punch having a radius formed about its leading edge, said first slug remaining connected to said first sheet by a continuous web portion.
    C. forming a second slug of metal from a portion of said second superimposed sheet, said second slug of metal being extruded from said second sheet by the punching action of said first slug, said second slug remaining connected to said second sheet by a web portion;
    D. embedding said first slug in said at least one second sheet at said portion of said second sheet from which said second slug has been formed so as to form a tight mechanical interfit, said first slug remaining connected to said first sheet by said continuous web portion, said first slug not extending out of said second sheet; and then
    E. shearing said second slug from said at least one second sheet.

2. A process as in claim 1 wherein a plurality of said joints are formed between said sheets of metal by repeating steps B, C, D and E for each of said plurality of said joints.

3. A process as in claim 2 wherein said sheets of metal comprise at least one metal selected from the group consisting of copper, copper base alloys, aluminum and aluminum base alloys.

* * * * *